Patented Jan. 13, 1942

2,269,733

UNITED STATES PATENT OFFICE 2,269,733

PROCESS AND MANUFACTURE OF METALLIC BROMIDES

Edward P. Pearson, Trona, Calif., assignor to American Potash & Chemical Corporation, Trona, Calif., a corporation of Delaware No Drawing. Application June 17, 1938, Serial No. 214,387

9 Claims. (Cl. 23—87)

This invention relates to the preparation of metallic bromides and has particular reference to processes for producing bromides free of bromates, from bromine and a suitable metal compound.

One of the principal objects of my invention is to provide a process whose equipment requirements will be greatly simplified as compared with those of past practice. A number of processes have been proposed and used for the manufacture of bromides from bromine, but such processes have either failed to prevent the formation of bromate or have entailed elaborate equipment for carrying out reactions which would prevent such formation of bromate. Also prior processes have necessitated especial precautions and equipment to avoid loss of bromine in vapor form. My process is so arranged that it may be conducted in an extremely simple fashion; in fact, if properly operated in it complete form, open vessels may be used without serious volatilization loss of the valuable products, or inconvenience to the workmen.

Another object of the invention is to provide a system for the manufacture of metallic bromides, free of bromates, in which system little or no evaporation need be practiced. In past processes, solutions containing bromide have been made, and the dissolved metallic bromide recovered by evaporation of the liquor. In one form, my process practically dispenses with the necessity of such evaporation, producing the desired metallic bromide, free of bromate, as a primary precipitate.

Another advantage or object of this invention is that I am enabled, when necessary, to operate at temperatures higher than have been used in the past. For example, when it is desired to crystallize anhydrous sodium bromide directly from the reaction liquor, it is necessary that said liquor be maintained above 45°–50° C. The latter is approximately the temperature of transition between NaBr.2H₂O and NaBr in pure water; the lower value may obtain in the presence of a second solute. Consequently, for a practical operating process, it is necessary that the mother liquor be maintained at, say, 60 or 65° C. The means by which this advantage is gained lies in the coordination of the factors determining the composition of the menstruum in which the reaction is carried out. This coordination involves control of the composition of the starting solution or reaction medium and control of the relative proportions of the added reagents which are dispersed in the solution during the reaction.

Various further objects and advantages of the present invention will be apparent from the following description of the preferred process or processes of producing metallic bromides embodying the present invention.

In accordance with the present invention, metallic bromides may be produced through the use of either liquid bromine, gaseous bromine, or a mixture of bromine vapor with other gases I have generally employed liquid bromine.

When bromine is reacted with a basic metallic compound, such as soda ash, the resultant reaction is as expressed by the following equation:

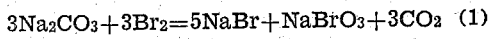
$3Na_2CO_3 + 3Br_2 = 5NaBr + NaBrO_3 + 3CO_2$ (1)

This reaction produces a mixture of bromide and bromate. If sodium bromide is the desired product, then the bromate must be removed by some suitable means, and the removal of the sodium bromate once formed is a tedious and expensive operation. When ammonium hydroxide is reacted with bromine, the reaction is as expressed by the following equation:

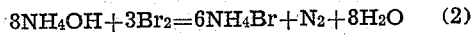
$8NH_4OH + 3Br_2 = 6NH_4Br + N_2 + 8H_2O$ (2)

The above reaction has the advantage over Reaction 1 above (wherein a basic metallic compound is used) in that no bromate formation takes place. However, ammonium bromide is not in many cases the desired commercial product, and it is necessary to convert the ammonium bromide into a metallic bromide.

A solution containing ammonium bromide, instead of ammonia or ammonum hydroxide, may be employed as a menstruum in which to react bromine and a basic metallic compound for the formation of a metal bromide, without the accompanying formation of sodium bromate as occurs in the Reaction 1. The reaction between bromine and the basic metallic compound in the presence of ammonium bromide may be illustrated by the following reaction between bromine and soda ash:

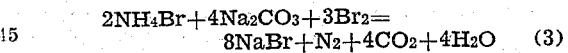
$2NH_4Br + 4Na_2CO_3 + 3Br_2 = 8NaBr + N_2 + 4CO_2 + 4H_2O$ (3)

In Reactions 2 and 3, the ammonia or ammonium hydroxide and ammonium bromide act as reducing agents to prevent the formation of bromate. Various reducing agents may be employed for the reaction between bromine and the basic metallic compound. For example, there may be employed urea, formic acid, oxalic acid, ammonium carbonate, ammonium bicarbonate, formamide, etc. There may also be utilized an aqueous mixture of ammonia and urea, commercially known as "P" liquor, which is now supplied to the fertilizer manufacturers. In general, the reducing agent may be chosen from a considerable class of organic and inorganic compounds which during the reaction do not form in the solution any cumulative contaminating substance. Various salts of suitable reducing agents may be employed, such as calcium nitride, sodium formate, calcium cyanimide, etc., as long as the contained metal is congruent with the desired metal bromide.

Various basic metallic compounds may be employed, depending on the metallic bromide to be produced. The basic metallic compound may be an oxide, hydroxide, or carbonate of the desired metal, such as CaO, Cd(OH)$_2$, or Na$_2$CO$_3$. Other basic metallic compounds could be used, but preferably a compound is to be selected which will not add to the process any contaminant requiring special steps for its removal. We also find that the invention may be applied with greater advantage to such basic compounds of metals which react with bromine in the presence of reducing agents and form bromides which are stable and do not hydrolize in aqueous solutions. Thus basic compounds of the following elements may be employed: lithium, sodium, potassium, rubidium, cesium, magnesium, calcium, strontium, barium, yttrium, lanthanum, thorium, cerium, rhodium, gallium, indium, thallium, tin, lead, selenium, copper, zinc, cadmium and mercury. Of these metals, the invention will be more generally useful in producing metal bromides of the first and second groups of the periodic system, because the bromides of such metal have more general application and the bromine may be more economically supplied in such form than in the form of the bromides of other metals. By the term "basic metal compounds," I refer particularly to oxides, carbonates, and hydroxides.

The commonest and cheapest bromide preparation is a preparation of sodium bromide, and I have directed the major description hereafter to the production of that bromide using as a basic metallic compound soda ash or Na$_2$CO$_3$. In the case of producing sodium bromide from soda ash, bromine and ammonia, the resultant reaction may be considered to take place in one step rather than the two successive steps shown in Reactions 2 and 3. In such case, the reaction may be expressed as follows:

3Na$_2$CO$_3$+3Br$_2$+2NH$_3$=
   6NaBr+3CO$_2$+N$_2$+3H$_2$O   (4)

In accordance with my invention, the reaction between bromine, basic metallic compound, and reducing agent, as represented by Equation 4, is carried out in a menstruum or solution, the composition of which is so controlled throughout the process as to materially inhibit volatilization of the reagents used in the process. For this purpose, I employ a starting solution or menstruum which is saturated or nearly saturated with the metallic bromide to be produced and maintain such solution at or near saturation throughout the process. In addition to having the solution saturated with the metallic bromide which is to be formed, I may also at times further load the solution with other soluble bromides.

By having the solution highly concentrated with respect to soluble bromides, I have found that the elemental bromine introduced into the system becomes extremely soluble and exhibits surprisingly low volatility. As a consequence, losses of the bromine, even when the temperatures are raised considerably above the normal boiling point of bromine, are maintained very low. When, in addition, the quantities of the various reactants are controlled in accord with other features of my invention, losses of valuable reagents by volatilization are negligible, even in open vessels.

The advantage in maintaining the solution highly concentrated or saturated with respect to soluble bromides may well be appreciated when I state that I have found that a saturated solution of sodium bromide, for example, will dissolve about eight times as much bromine as one which is only half saturated, about twenty-four times as much as one which is only one-quarter saturated, and about one hundred fifty times as much as pure water, at the same temperature. Thus, it may be seen that the increased solubility of bromine in bromide solutions is not a straight line function of concentration, but increases enormously as the concentration increases.

As a corollary to the foregoing propositions regarding saturation values of bromine in various solutions, the high concentrations of bromide which I employ in my menstruum are highly advantageous in reducing the vapor pressures of bromine in the reaction mixtures, which normally contain only a fraction of the possible bromine saturation value. Pure bromine exhibits vapor pressures which vary directly with the temperature and such vapor pressures are given in the literature. Over solutions of bromine, the vapor pressure of bromine is determined by the ratio between the concentration of bromine in the solution and the solubility (at saturation) of bromine therein. At saturation, the vapor pressure is the same as that of pure bromine at the same temperature, while at other concentrations it is proportionate to the saturation vapor pressure in the ratio of:

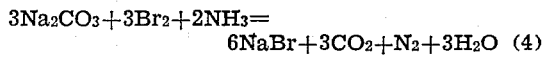

Thus, larger quantities of unreacted bromine may be carried in solutions having high bromine solubilities, while maintaining a reduced bromine vapor pressure, than in solutions having low bromine solubilities. As the reaction mixtures will normally, or can usually be controlled to, contain bromine in an amount only a fraction of the bromine saturation value in a saturated bromide solution, it is thus possible to effectively reduce or even eliminate the volatilization of bromine from the reaction mixture. The preferred form of the present invention is a cyclic one in which the metal bromide is produced by addition of bromine to mother liquor which is saturated with respect to the said metal bromide.

It is also one of the fundamental concepts and advantages of my process that the starting solution should contain a large quantity of reducing agent. Sufficient reducing reagent should be supplied, either in the starting solution or by addition during the reaction, so that there is present throughout the reaction an excess thereof. This I maintain to bring about a complete conversion of the subsequently added reactants, while entirely preventing the formation of bromates. As the first step of my cyclic process, this excess of reducing agent may be added to the mother liquor. When ammonia is used as the source of reducing agent, then ammonium bromide may be considered to be the active reducing agent, and it may be added as such, or it may be generated directly in the cycling liquor from the components at hand. One method of generating this reducing agent, ammonium bromide, is shown by the above Equation 2.

By maintaining a considerable excess of reducing agent present throughout the reaction, I am assured that the reaction will be completed without incurring bromate formation. This is of particular value near the end of the reaction, as when employing only the stoichiometric equivalent of reducing reagent according to Equations 3 and 4 there will occur toward the end of the reaction local deficiencies of reducing agent. This results in a slow reaction, and bromate formation ensues. An excess of reducing agent assures the prevention of bromate formation and permits the reaction to be completed promptly and effectively.

Another advantage in carrying this excess of reducing agent resides in the speed of reaction so obtained. I have come to the conclusion that the driving force of the reaction expressed by Equation 3 resides in the reducing agent itself. The reaction between bromine and the metal salt, such as expressed by Equation 1, is a slow one and in addition an undesirable one. I have found that the presence of an excess of reducing agent over and above the required stoichiometric quantity improves the reaction rate and drives the reaction rapidly and in the manner desired. In fact, I generally arrange to have present at the start (and at the end) of the process about as much reducing agent (as an excess) as is added and consumed in the ensuing steps.

A further advantage in maintaining an excess of reducing agent resides in the control of my process by visual means. Heretofore, I have not stressed the ease with which this process may be controlled without recourse to complicated analytical methods. When bromine and sodium carbonate, for instance, are brought together in stoichiometric quantities in water, the reaction is slow and the liquor may show a yellow color (indicating excess of bromine) over a long period. The same is true if only a stoichiometric quantity of reducing agent is present, especially toward the end of the reaction. If such conditions exist, then the batch can be "finished" or adjusted to its end point only very slowly, or "checked" or "balanced" only by means of a difficult analytical procedure. However, when the process is operated according to the method of this invention, the color and odor of the solution are all that are needed for the finishing or balancing steps of the process. From the standpoint of cost of operation, this is an extremely important feature. By maintaining an excess of reducing agent present in the liquor, all free bromine reacts quickly with the metal salt, as long as the menstruum contains said metal salt. If the brown or yellow color is not completely discharged in a relatively short time, I know immediately that there is truly an excess of bromine resident in the batch, and that steps must be taken to "neutralize" it.

I may state here that I prefer to finish a batch so that all of the bromine, as indicated by the yellow or straw color, is discharged. In the preferred form of my invention, wherein ammonia or ammonium bromide is used as the reducing agent, I prefer that the final or finished batch should contain a very slight excess of ammonia. Under these conditions, the solution will have the characteristic ammonia odor. This is maintained in such a manner as to not be excessively strong, but yet can be determined by odor, by an ordinary operator. Such condition can be brought about by adding a small excess of the metal compound at the end of the reaction. This method I use when the metal compound is easily soluble and is of an alkaline nature. By alkaline nature, I mean capable of reacting with the ammonium bromide present to liberate a small amount of free ammonia. In case the metal compound is not easily soluble, and might therefore contaminate the finished product, and at times for other process reasons, I may finish the batch and destroy the residual bromine by the addition of a small amount of ammonia, which reacts as a "neutralizer" according to Equation 2. Obviously, this produces a small amount of ammonium bromide, but since ammonium bromide is a useful constituent in the liquor this can constitute no disadvantage. In either case, the final solution will have a very slight, but not offensive or serious odor of ammonia which indicates to the operator that the batch is ready for subsequent treatment. This desire to neutralize the residual bromine arises from the necessity of protecting equipment against corrosive effects of that material.

By these means, the process lends itself to operation by ordinary chemical workers, and eliminates the necessity for complicated chemical control. The only point of chemical control which is needed is a rough, occasional check on the quantity of excess reducing agent (whatever it may be) present in the cycling liquor. Such check may be made either before adding the bromine and metal compound or after that step. The process is cyclical, the liquor always containing the metal bromide and the reducing agent; so, therefore, there can be little difference as to the point at which such a check would be made.

In addition to the use of the above-described starting solution, I control the addition to the starting solution of the reactants, bromine and basic metallic compound, so that the menstruum contains only small concentrations of unreacted bromine and/or metallic compound.

In particular, I prefer to introduce the bromine and metallic compound simultaneously, but at such relative rates that there will be present until the end of the reaction a slight excess of bromine over the metallic compound. Material local excesses of metallic compound are to be avoided, as they are likely to cause the formation of bromate despite the presence in the menstruum of sufficient reducing agent to prevent the formation of bromate. Metallic compound excesses involve a further disadvantage when the reducing agent is ammonia or an ammonium compound, as ammonia may be liberated and lost as a vapor. A slight excess of bromine improves the reaction rate, assures the absence of a local excess of metallic compound and facilitates visual control of the reaction. The rate of addition of the bromine and metallic compound must be kept low enough to avoid excessive foaming of the reaction menstruum, and rates that low will usually be small enough to avoid the presence of excessive quantities of either reagent in the menstruum under conditions of normal agitation.

The process of the present invention is of particular value when the basic metallic compound used in the process reacts only difficultly or slowly. One example of this is soda ash, which is the material most desirable to use in producing sodium bromide. Soda ash is neither highly nor rapidly soluble in a saturated bromide solution and does not at ordinary temperatures react quickly with bromine. However, I have found that the reaction may be made to go on easily and to completion if the solution is heated. In fact, I found it advantageous, when employing sodium carbonate, to heat the solution to something in the neighborhood of 60° C. or somewhat higher, say, to 70° C. When this is done, the reaction goes on smoothly and rapidly and the final product consists of pure sodium bromide without contamination. Such a temperature is considerably above the boiling point of elemental bromine, and it would be expected that complicated auxiliary equipment, such as condensers, etc., would be required to prevent undue losses of this valuable component. However, by using a menstruum containing a high concentration of soluble bromides, I am enabled to dissolve in this liquor sufficient bromine to cause the reaction to proceed smoothly and rapidly and without undue loss of bromine.

This feature of my invention, namely, the use of increased temperature, is applicable to a variety of situations in which for one reason or another it is desired to secure certain advantages of operation at higher temperatures. I have already pointed out the advantage of increasing the reaction rate in the case of sodium carbonate. Higher temperatures would also increase the reaction rate with nearly all reagents although to a greater extent with some reagents than with others. Certain reducing agents also exhibit increased reactivity at higher temperatures. For maximum reactivity I prefer to operate at between about 40–70° C. Within that range the reaction will be speeded up so that conversion of bromine to bromide proceeds smoothly and rapidly but with only negligible volatilization of bromine, so long as the factors determining the composition of the menstruum are coordinated in accordance with my invention. The ability to use higher temperatures without incurring serious losses of bromine by volatilization, is also applicable to cases where it is desired to produce a particular hydrate of the desired bromide, which hydrate is stable only at higher temperatures. Temperatures above about 70° C. however will entail appreciable bromine volatilization even with my invention although the losses will be considerably reduced therewith.

In order to facilitate the understanding of my invention, the following solubility data with respect to the system $NaBr$—$NH_4Br$—$H_2O$ is given:

| Point saturated with— | Grams per 100 grams $H^2O$ | |
|---|---|---|
| | NaBr | NH₄Br |
| $NaBr.2H_2O$ at 35° C | 100.6 | |
| $NaBr.2H_2O + NH_4Br$ at 35° C | 97.14 | 28.03 |
| $NaBr$ at 50° C | 116.2 | |
| $NaBr + NH_4Br$ at 50° C | 96.74 | 36.36 |

It may be seen that if sodium bromide is crystallized at 35° C., the dihydrate is the stable phase, whereas if the crystallization is carried on at temperatures above 50° C., the anhydrous salt is produced. Another point of interest regarding solubilities is that of sodium carbonate in a saturated sodium bromide solution. As has previously been indicated, soda ash is not very soluble in such a system; at 35° C., 100 grams of water containing 99 grams of sodium bromide will dissolve only 4 grams of sodium carbonate.

In the preferred form of my process, when using ammonium bromide as the reducing agent, I may conduct the process in two steps. To the mother liquor from a previous cycle I add bromine. I then introduce through a submerged pipe sufficient gaseous ammonia to convert this free bromine into the ammonium bromide needed for the cycle in mind, according to the Equation 2 above. The bromine so added to the solution is extremely soluble due to the high concentration or saturation value of sodium bromide in the mother liquor. Consequently, it exerts very little vapor pressure when so added and the solution may be vigorously agitated during the introduction of the gaseous ammonia. In actual practice, both the liquid bromine and the ammonia are added in the first step of this process continuously or practically simultaneously. However, I prefer to keep the bromine going into the solution somewhat "ahead" of the ammonia so that this volatile, valuable compound ($NH_3$) will not be lost, and so that I will not have to provide complicated and expensive equipment for saving it and for making my plant a livable place. I have found that this reaction is a rapid one and goes to completion with ease. The reaction is exothermic. It may at times be desirable to provide coils or jackets to control the temperature. By conducting this first step as expressed by Equation 2 ahead of the final step which is expressed by Equation 3, I am able to introduce into the solution the most volatile component, ammonia, without subjecting it to the greater heat of reaction of the combined equations. Likewise, in this first Reaction 2 much less non-condensible gas is liberated than in the second step, and this tends to prevent losses of said ammonia. Thus, these combined features of my process enable me to introduce into a simple reaction tank two ingredients which have heretofore caused immeasurable grief.

In operating the process of this invention as a cyclic manipulation, the several ingredients are added to end liquor from a previous batch, the reaction completed, and the metal bromide precipitated in situ. The quantity of material manufactured per cycle is limited by the desired density of the resulting sludge of the metal bromide. I have found that a sludge containing 30% solids by weight, i. e., 30% of the precipitated metal bromide, is about as heavy as can be handled in commercial operations. In actual practice, I work with sludges of somewhat lesser density than this.

As an example of one form in which this invention has been practiced, I wish to set forth the following: The cycle is started using 1,000 gallons of end liquor from previous operations. This end liquor is in a suitable, non-corrodible tank fitted with suitable jackets which may be used either for heating or cooling purposes. The tank has a total volumetric capacity considerably in excess of the liquor capacity, so as to provide for foaming and agitation. The tank is also fitted with a strong agitator for mixing the ingredients. The tank contains 1,000 gallons of end liquor, providing 6,370 pounds of NaBr and about 800 pounds of $NH_4Br$. This liquor has no yellow color of free bromine, but on the contrary exhibits a slight odor of ammonia, indicating that it also contains either a small amount of free ammonia ($NH_4OH$) or a small amount of excess alkali ($Na_2CO_3$). Exact analysis is not made for excess alkali, for such analysis is unnecessary to the operation of this invention. In a suitable measuring tank, I provide 683 pounds of liquid bromine, this bromine being sufficient when reacted with ammonia to form 837 pounds of ammonium bromide according to Reaction 2 above. While agitating the liquor, I start this bromine into the 1,000 gallons of liquor and also introduce, practically simultaneously, a stream of gaseous ammonia. I aim to add ammonia in stoichiometric proportion to that expressed by Equation 2. The flow of ammonia may be controlled by means of meters, manometers, etc., so that about the correct quantity of both reagents will be added over the same period of time, say, in two hours or somewhat longer. Since the bromine is, if anything, the less volatile of the two components under the special conditions obtained in my process, I prefer to keep the bromine introduction somewhat "ahead" of the ammonia introduction. In other words, it is preferred, during this reaction, that the liquor be maintained with a slight yellow color. At the finish of this first step, I generally aim to have the bromine about "neutralized," but this is not entirely necessary. If a slight excess of bromine remains, it is of no consequence. This follows, as more bromine is to be added in the next step of the process. Thus, it may be seen that the demarcation between the two steps is not sharp; said steps may be more or less blended one into the other, as will be more fully discussed below.

In the second step of the process I add more bromine and also the metal salt. In a suitable hopper, I place 1,825 pounds of commercial soda ash containing 1,812 pounds of true $Na_2CO_3$. I also again fill the measuring tank with 2,050 pounds of liquid bromine. I then start the flow of bromine into the reaction mixture and also start feeding in the soda ash by means of a suitable proportioning device, such as a screw feeder, a shaking or vibrating feeder, etc. I arrange the flows of these ingredients so that over the course of, say, 6 to 8 hours both have been added more or less together. The rate at which the ingredients are added is generally controlled by either one of two factors, namely, the ability of the equipment to respond to the desired temperature control or by the degree of foaming caused by the reacting substances. Generally, I have had to control my process to keep the foaming conditions within bounds. Here again I prefer to maintain the bromine addition somewhat ahead of the soda ash addition, thereby maintaining a slight bromine (yellow) color in the liquor. As previously noted, soda ash is neither rapidly nor highly soluble in this liquor. Hence, there may be present temporarily during these additions some suspended unreacted sodium carbonate in the system. However, so long as the desired bromine color persists in said liquor, this is of little consequence. If during this reaction it is seen that the bromine color is disappearing, I readjust the flows so as to maintain the desired conditions.

At the end of the reaction the remaining bromine may be discharged by adding a further quantity of soda ash and stirring, or a slight injection of gaseous ammonia may be made to discharge this color. I have found that the latter procedure is considerably more rapid and easy and that the average chemical operator in the plant will generally choose this method, and use it, in preference to "titrating" the batch with the fixed alkali. Since there is already an excess of ammonium bromide cycling in this system, it makes very little difference which method is used so long as the process is kept under control by a periodic check.

In this example, it is my desire to produce pure anhydrous sodium bromide. Consequently, the operation is carried on at about 60° C. The starting batch of mother liquor may have cooled while lying idle in the tank between batches. During the first step of the reaction, no attempt is made to bring this mother liquor to any fixed temperature, but rather the heat of reaction between the gaseous ammonia and the dissolved bromine is allowed to raise the batch temperature. During the second step, however, the temperature is controlled between 50 and 60° C., being held there by means of the aforementioned jackets. During this second step a sludge is formed which contains about 21% suspended sodium bromide by weight. Under these conditions of operation the batch conditions are closely balanced, and the final liquor contains 800 pounds of $NH_4Br$, which may be seen to be equal to that which is contained in the original starting liquor. The sludge is then passed to a centrifugal wherein the solid NaBr is separated. According to the purity desired, the material in the centrifugal basket is given a wash of varying intensity; it is then discharged to suitable drying equipment. There is recovered, as a result of these operations 3,520 pounds of sodium bromide, 98.9% pure.

The only impurity in the system comprises the impurity in the soda ash and a slight impurity resident in the liquid bromine. Of course, the cycling liquor contains a certain amount of ammonium bromide and this may, at times, be occluded in the final product. However, it seldom exceeds the commercial limits of purity for such a product, and furthermore it may be materially reduced by means of suitable washing in the centrifugal basket. The end liquor from the centrifugal basket, together with whatever wash liquor is used, is returned to the reaction tank in order to continue production.

As previously indicated, this process is cyclical and practically self-sustaining. However, at times, the volume of the cycling liquor may increase slightly due to various causes. Such volume may be continually or periodically reduced by the simple expedient of turning steam into the aforesaid jackets and allowing a small amount of evaporation to take place to readjust the volume. Any sodium bromide precipitated during this evaporation will, of course, simply enter the next cycle and be removed along with the major product. Of course, if the volume of the cycling liquor persistently diminishes, water must be added to maintain the desired volume.

In the example just given, about 800 pounds of ammonium bromide are contained in the liquor at the end of the reaction. This represents about 35% of the possible saturation value at about 50° C. While it is always desirable to have present at the end of the reaction an excess of ammonium bromide or other reducing agent, the quantity does not have to be as great as that indicated in this example. When the reducing agent becomes an undesirable impurity in the final product, it is best to have present in the final liquor from which the metal bromide is removed the least workable quantity of said reducing agent. A periodic analysis is made upon the cycling liquor to determine the quantity of reducing agent, such as ammonium bromide, which is contained therein. If this quantity tends to increase, then larger proportions of bromine and metal salt may be added in the next cycle to reduce it somewhat. If the quantity tends to decrease, a somewhat larger quantity of ammonia and bromine may be added in the first step of the process to increase its concentration.

The process of my invention does not require that the various reagents, especially the bromine and the metal salt, be weighed out with extreme accuracy. The requisite balance between the two of them is obtained by a final "titration" or adjustment at the end of the batch, as previously described. In addition, moderate fluctuations of the total weight of these ingredients are likewise absorbed, due to the floating or circulating load of reducing agent which is carried for this and other purposes. Thus, my process is simple and easy to operate.

Although I have described this particular manner in which my invention may be performed as embracing a two-step process, I have done this largely for the purpose of explanation, and for complete understanding thereof. In actual practice, I have found it unnecessary actually to weigh out the bromine in two separate batches. Instead, I measure out the bromine needed for the complete reaction and start it, together with the ammonia, running into the cyclic liquor, at the proper temperature. Very shortly thereafter, I may begin adding the soda ash. The rates of flow of these ingredients are controlled in such a manner that they will all have entered the batch at about the same time. The only precaution I take under such conditions is to see that the bromine color of the solution does not at any time become excessively dark or excessively light, and that the soda ash flow shall be held back so that it will be the last ingredient to finish entering the batch. In this manner it is seen that the two-step process described above, resolves itself more or less into a one-step process, but that it at all times adheres to the aforestated principles of this invention.

As another example of my invention, I have manufactured potassium bromide in a manner quite similar to the foregoing, except in that I employed KOH instead of $Na_2CO_3$, and, furthermore, I used urea, $CO(NH_2)_2$ as the reducing agent. The equation for this reaction corresponding with Equation 3 above is as follows:

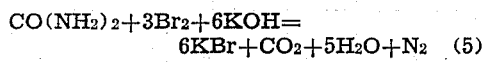

$$CO(NH_2)_2 + 3Br_2 + 6KOH = 6KBr + CO_2 + 5H_2O + N_2 \quad (5)$$

In this instance, an excess of urea amounting to about 200 pounds per 1,000 gallons of mother liquor is carried in the cycle in place of the ammonium bromide used in the above example. The urea required or consumed in Reaction 5 is then added to the liquor in the reaction tank, but no bromine is added as at step 1 of the process above. In the second step of the process, the requisite bromine and potassium hydroxide are added and a crop of solid KBr is produced as a sludge. The bromine is added in a manner similar to that set forth above. The KOH is dissolved in a portion of the end liquor from a previous batch and the solution added simultaneously with the bromine. I have found that potassium bromide does not form hydrates as does sodium bromide, and the reaction proceeds smoothly at lower temperatures. So in this case it is unnecessary to maintain the temperature at any fixed point; instead I operate at a somewhat lower temperature than in the above example. The final balancing or titration of the finished sludge is done with KOH rather than with ammonia, as in this case the presence of ammonium salts in the system is considered undesirable.

A further example of my process, wherein I have utilized instead of liquid bromine a mixture of bromine and air, is as follows: The mixture of bromine and air may be obtained from certain well-known processes for removing bromine from sea water and the like. When employing my invention on such a material, I may either precipitate the desired metal bromide directly as a sludge, or I may revert to the old practice of producing only a concentrated solution of the metal bromide which is afterwards evaporated for the recovery of the metal bromide. If the first condition obtains, I use an open tower and distribute the various liquors entirely by means of spray nozzles. However, there are in the industry many packed towers available for use and I shall describe this example of my invention in the terms of utilizing a packed tower wherein precipitation of solid components to any material extent is considered undesirable.

The tower contains three sections. Said sections are formed by the usual grid plates, above which suitable packing material, such as rings, is placed. No section is completely filled with packing, but a space is left at the top of each section for various purposes, as described below. In the system which I have devised for the practice of my invention on bromine-air mixtures, I employ a concurrent flow principle, rather than the usual counter-current flow principle. In this feature I believe that my process is novel and deviates entirely from past art practices.

As in ordinary absorption tower practice, I provide a pump for circulating a large stream of liquor from the bottom of the tower to the top of the tower. The process may be conducted either batch or continuously. I shall describe it in terms of the latter method. In such instance, a small stream of bromide-laden liquor is continuously withdrawn from the circulating pipe line. This bleed-off stream is sent to an evaporator wherein water is removed and the metal bromide is precipitated. Evaporation may be carried on to a point short of reaching saturation with some other material, such as the reducing agent, whereupon the evaporator liquor after removal of the precipitated metal bromide is returned to the circulating system serving the tower. The water required to keep the process in balance is introduced into this evaporator end liquor, into the tower circulating stream with other reagents added to the tower, or as any suitable combination of these methods.

In the example under consideration, I again employ ammonia as the fundamental reducing agent. Sodium hydroxide, NaOH, in solution, is used as the source of the metal salt. The bromine-air mixture enters the top of the tower, together with the circulating stream of tower liquor previously described. Sufficient space is provided at the top of the tower to distribute the gas and the liquid over the packing. In the first section of the tower, bromine is absorbed from the gas mixture but no formation of sodium bromide takes place.

The upper portion of the second section of the tower likewise contains an open space for introducing reagents. In one form of my invention, I introduce a stream of gaseous ammonia through a suitable distributor just under the grid of the first section. This action is seen to correspond with the first step of my first example given above. I have also found it possible to introduduce the reducing agent into the circulating line feeding the top of the tower, from whence it is entirely conveyed into the first section of the tower. When ammonia is so employed, it is here caused to react with part of the bromine in the gas mixture, forming ammonium bromide for the subsequent reduction reaction.

Just above the packing of the second section of the tower, I introduce a well distributed spray of dilute sodium hydroxide solution. The stream of sodium hydroxide solution, or other suitable metal salt, is small compared with the total flow of liquid in the tower, thereby providing the desired low concentration of metal salt. This material flows uniformly upon the packing, and mixes with the down-flowing liquid and gas mixture. At this point the reaction corresponding to the second step described above and likewise corresponding to Equation 3 takes place. A considerably greater packed length is provided in the second section of the tower than in the first section.

At the bottom of the second section I provide a small take-off device for transferring a small continuous stream of liquor from the interior of the tower through a sight-glass located outside. A suitable conduit is provided for returning the stream into the third section of the tower. The sight-glass is provided to enable the operator to control the process. At the point where the liquor leaves the second section of the tower, I intend that there shall always be present a slight excess of bromine. This becomes, of course, visible in the sight-glass and the operator uses the information to adjust the flows of ammonia and/or sodium hydroxide at the upper part of the tower. If desired, such control may be made automatic by means of a photoelectric cell and suitable actuating devices.

At the top of the third section of the tower I provide a second ammonia inlet for adjusting or "neutralizing" the final liquor. As described in the first example, it is desirable that the last trace of bromine should be removed from the liquor before it passes to other steps of the process. This is done by introducing a small stream of ammonia into the last or bottom section of the tower. Control of this adjustment may be had by analyzing (or smelling) the exit gas from the tower.

In this manner, the bromine-air mixture is caused to react with suitable reagents to produce a solution practically free of bromates. The process likewise results in a complete removal of bromine from the gas leaving the tower, and said exit gas contains very little valuable ammonia when the process is correctly controlled. According to the precepts of this invention, there is always present in the circulating liquor an excess of reducing agent, so that, at no time, can any bromate be formed. The reaction in the second section of the tower is entirely controlled by the dilute caustic and, so long as the liquor passing through the sight-glass below said second section shows a bromine reaction, there can be no formation of bromate. If this liquor becomes too light in color, then the operator knows that the quantity of bromine in the entering gas mixture has decreased and consequently he cuts down on his flow of sodium hydroxide solution or of his ammonia solution, or both; and vice versa.

The final neutralization, in the third section, is obviously congruent with the aims and desires of this process of my invention, for such neutralization simply produces a small amount of ammonium bromide which is itself the reducing agent employed in this example. This reaction is a vigorous and positive one, and serves to remove the last of the bromine from the exit gases. Due to the fact that the liquor which is bled off the circulating stream must be evaporated to recover its sodium bromide content, and also due to the fact that saturation with respect to a reducing agent, such as ammonium bromide, must not be reached in the evaporators, a somewhat greater limitation is placed upon the quantity of ammonium bromide present in the liquors than is imposed in the case of the foregoing batch process. In fact, I prefer that the liquor leaving the tower should contain about 5 grams of $NH_4Br$, and preferably not over 10 grams of $NH_4Br$, per 100 grams of water. Due to the fact that a large circulating stream may be employed when operating such a tower, it is unnecessary that the absolute concentration of ammonium bromide should be high. The fact is that such a circulating stream always provides a large excess of reducing agent (when considered in pounds per minute) as compared with the requirements. As in the batch process, an occasional check is taken upon the circulating liquor to determine its ammonium bromide or reducing agent content. If it is seen to increase, then the stream of ammonia or reducing agent which is introduced at the upper section of the tower must be cut down or regulated to keep the balance. This point of control must be taken into account when considering changes to the sodium hydroxide stream, as just described.

An outstanding characteristic of the reactions heretofore described is that the reducing agent is inactive even in the presence of an excess of free bromine, unless there is also present the metal salt which enters into the reaction. This is clearly shown by Equations 3 and 5. There are other types of reducing agents which, however, are capable of reacting with bromine even in the absence of a metal compound to produce hydrobromic acid. If hydrobromic acid is a desired product, then such a reaction may be allowed to go forward. However, if the metal bromide is the desired product, I prefer to prevent formation of hydrobromic acid in the solution. Hydrobromic acid so formed is corrosive to the equipment and also it is somewhat volatile and may entail a loss of the valuable bromide. I have found that sodium formate reacts with bromine according to the following equation:

$$CHO_2Na + Br_2 = NaBr + HBr + CO_2 \qquad (6)$$

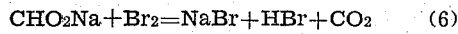

This reaction is typical of several reducing agents which are available for use in my process. With such reducing agents, I carry out the process very much as set forth in the first example of this specification. According to the percepts of my invention, whereby controlled admission of the two reagents (metal compound and bromine) is practiced, I am enabled to utilize such reducing agents without incurring formation of free hydrobromic acid. This is, at the same time, accomplished without resorting to the expediency of having present in the liquor any appreciable excess of metal compound, such as sodium hydroxide or potassium carbonate, which excess would result in bromate or hypobromate formation, upon addition of the bromine. However, I prefer that the cyclic liquor should be maintained neutral or slightly alkaline to avoid acid corrosion.

In order to neutralize the hydrobromic acid formed in Equation 6, it is obvious that a suitable metal compound, such as sodium carbonate, must be added. Hence, I employ as a starting liquor a solution containing sodium formate and a little sodium carbonate in solution. This solution is, of course, saturated with respect to sodium bromide. To this mixture, I add bromine and sodium carbonate, as in the second step of the first example given in this specification. While the concentration of the metal compound, such as sodium carbonate, potassium hydroxide, etc., is seen to be very slightly in excess in this example, I do not like to have the concentration of caustic too high, for bromate (or hypobromite) formation takes place if such a condition obtains. When reducing agents of this type are employed, I control the process, i. e., the rate of introduction of bromine and metal compound by means of a simple pH indicator. Such a test may be operated by the average chemical plant operator to maintain the batch practically neutral, or slightly alkaline, during the controlled addition of the reagents (metal compound and bromine) to the batch.

By so controlling the concentration of the metal compound and by maintaining in the cycling solution an excess of a reducing agent (in accordance with the fundamental precepts of this invention), I am able to produce economically and easily a crop of metal bromide from bromine and reducing agents of this latter class without formation of bromates and without formation of hydrobromic acid. While this example has dealt with the sodium salt of a reducing acid, it is obvious that what has already been said applies equally to the free acid itself, as the metal salt of the free acid results directly by neutralization of that acid with the metal salt which is to be combined with the bromine.

While the foregoing examples of my process are well adapted to carry out the objects and advantages thereof, it is to be understood that various other modifications and changes may be made, all coming within the scope of the invention as defined in the appended claims.

I claim:

1. The process of producing metal bromides, which comprises adding substantially simultaneously and continuously bromine and a metal compound of the group consisting of oxides, hydroxides, and carbonates to a substantially saturated aqueous solution of the desired bromide, said bromine and metallic compound being added in such proportions that the corresponding metal bromide is formed without substantial formation of metal bromate and in such proportions that a small amount of free bromine is maintained during substantially the entire course of the reaction to form metal bromide, and maintaining a substantial excess of a reducing agent during substantially the entire course of the reaction to form metal bromide so that there is no substantial formation of metal bromate.

2. A process of producing metal bromides, which comprises adding substantially simultaneously and continuously bromine and a metal compound of the group consisting of oxides, hydroxides, and carbonates to a substantially saturated aqueous solution of the desired bromide, said bromine and metal compound being added in such proportions that the corresponding metal bromide is formed without substantial formation of metal bromate and in such proportions that a small amount of free bromine is maintained during substantially the entire course of the reaction to form metal bromide, and maintaining a substantial excess of a reducing agent, which does not form HBr by reaction with aqueous solution of bromine, during substantially the entire course of the reaction to form metal bromide so that there is no substantial formation of metal bromate.

3. A process of producing metal bromides, which comprises adding substantially simultaneously and continuously bromine and a metal compound of the group consisting of oxides, hydroxides, and carbonates to a substantially saturated aqueous solution of the desired bromide containing ammonium bromide as a reducing agent, said bromine and metal compound being added in such proportions that the corresponding metal bromide is formed without substantial formation of metal bromate and in such proportions that a small amount of free bromine is maintained during substantially the entire course of the reaction to form metal bromide, and maintaining a substantial excess of the ammonium bromide reducing agent during substantially the entire course of the reaction to form metal bromide so that there is no substantial formation of metal bromate.

4. A process of producing metal bromides, which comprises adding substantially simultaneously and continuously bromine and a metal compound of the group consisting of oxides, hydroxides, and carbonates to a substantially saturated aqueous solution of the desired bromide containing ammonium bromide as a reducing agent, said bromine and metal compound being added in such proportions that the corresponding metal bromide is formed without substantial formation of metal bromate and in such proportions that a small amount of free bromine is maintained during substantially the entire course of the reaction to form metal bromide, and maintaining by continuous addition of bromine and ammonia a substantial excess of the ammonium bromide reducing agent during substantially the entire course of the reaction to form metal bromide so that there is no substantial formation of metal bromate.

5. A process of producing metal bromides, which comprises adding substantially simultaneously and continuously bromine and a metal compound of the group consisting of oxides, hydroxides, and carbonates to an aqueous end liquor from a previous operation substantially saturated with the desired bromide, said bromine and metal compound being added in such proportions that the corresponding metal bromide is formed without substantial formation of metal bromate and in such proportions that a small amount of free bromine is maintained during substantially the entire course of the reaction to form metal bromide, maintaining a substantial excess of a reducing agent during substantially the entire course of the reaction to form metal bromide so that there is no substantial formation of metal bromate, separating the precipitated metal bromide, and returning the resulting end liquor to the process as aforesaid.

6. A process of producing sodium bromide, which comprises adding substantially simultaneously and continuously bromine and sodium carbonate to a substantially saturated aqueous solution of sodium bromide, said bromine and sodium carbonate being added in such proportions that sodium bromide is formed without substantial formation of sodium bromate, and in such proportions that a small amount of free bromine is maintained during substantially the entire course of the reaction to form sodium bromide, and maintaining a substantial excess of a reducing agent during substantially the entire course of the reaction to form sodium bromide so that there is no substantial formation of sodium bromate.

7. A process of producing sodium bromide, which comprises adding substantially simultaneously and continuously bromine and sodium carbonate to a substantially saturated aqueous solution of sodium bromide, said bromine and sodium carbonate being added in such proportions that sodium bromide is formed without substantial formation of sodium bromate and in such proportions that a small amount of free bromine is maintained during substantially the entire course of the reaction to form sodium bromide, maintaining a substantial excess of a reducing agent during substantially the entire course of the reaction to form sodium bromide so that there is no substantial formation of sodium bromate, and maintaining the temperature of the aqueous solution between 50° C. and 70° C. during the entire course of the reaction.

8. A process of producing metal bromides, which comprises reacting ammonia and bromine in an aqueous solvent to form a solution of ammonium bromide, then adding substantially simultaneously and continuously bromine and a metal compound of the group consisting of oxides, hydroxides, and carbonates in such proportions that the corresponding metal bromide is formed without substantial formation of metal bromate and in such proportions that a small amount of free bromine is maintained during substantially the entire course of the reaction to form metal bromide.

9. A process of producing sodium bromide, which comprises adding substantially simultaneously and continuously bromine and sodium carbonate to a substantially saturated aqueous solution of sodium bromide, said bromine and sodium carbonate being added in such proportions that sodium bromide is formed without substantial formation of sodium bromate, and in such proportions that a small amount of free bromine is maintained during substantially the entire course of the reaction to form sodium bromide, and maintaining a substantial excess of ammonium bromide during substantially the entire course of the reaction to form sodium bromide so that there is no substantial formation of sodium bromate.

EDWARD P. PEARSON.